United States Patent
Walters et al.

(10) Patent No.: US 10,865,711 B2
(45) Date of Patent: Dec. 15, 2020

(54) AIR INLET SYSTEM FOR AUXILIARY POWER UNITS

(71) Applicant: PRATT & WHITNEY CANADA CORP., Longueuil (CA)

(72) Inventors: Nigel Walters, Ville d'Anjou (CA); Nicholas Ngoly, St. Lambert (CA); David Cerantola, St. Lambert (CA); Mark Cunningham, Montreal-Ouest (CA); Roger Lachance, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 202 days.

(21) Appl. No.: 16/054,252

(22) Filed: Aug. 3, 2018

(65) Prior Publication Data
US 2020/0040819 A1    Feb. 6, 2020

(51) Int. Cl.
*F02C 7/055*    (2006.01)
*B64D 33/02*    (2006.01)

(52) U.S. Cl.
CPC .............. *F02C 7/055* (2013.01); *B64D 33/02* (2013.01); *B64D 2033/0213* (2013.01); *B64D 2033/0246* (2013.01); *F05D 2250/51* (2013.01)

(58) Field of Classification Search
CPC ...... B64D 2033/0213; B64D 2033/022; B64D 2033/0246; F02C 7/32; F02C 7/05; F02C 7/052; F02C 7/055
See application file for complete search history.

(56) References Cited

U.S. PATENT DOCUMENTS

| | | | |
|---|---|---|---|
| 3,421,296 A | 1/1969 | Beurer | |
| 9,340,295 B2 | 5/2016 | DeDe et al. | |
| 9,377,030 B2 | 6/2016 | Matwey et al. | |
| 9,719,352 B2 | 8/2017 | Sheoran et al. | |
| 2003/0080244 A1* | 5/2003 | Dionne | B64D 33/08 244/57 |
| 2004/0194975 A1* | 10/2004 | Trumper | B64D 41/00 169/35 |
| 2009/0139200 A1* | 6/2009 | Colaprisco | F04D 29/70 60/39.092 |
| 2016/0264251 A1* | 9/2016 | Bell | B64D 15/16 |

FOREIGN PATENT DOCUMENTS

EP    3309077    4/2018

OTHER PUBLICATIONS

European Search Report received in counterpart EP application No. 19189852.7.

* cited by examiner

*Primary Examiner* — Gerald L Sung
(74) *Attorney, Agent, or Firm* — Norton Rose Fulbright Canada LLP

(57) ABSTRACT

An air inlet system for an auxiliary power unit (APU) has an intake duct having a wall defining an inlet plenum and forming an inlet opening configured to direct air into the inlet plenum. The system further comprising a load compressor passage in fluid communication with the inlet plenum and leading to a load compressor of the APU; and a core compressor passage in fluid communication with the inlet plenum and leading to a core compressor of the APU. A deflector is provided in the inlet plenum between the inlet opening and the core compressor inlet to deflect at least part of particles carried by an incoming airflow away from the core compressor inlet toward the load compressor inlet.

20 Claims, 5 Drawing Sheets

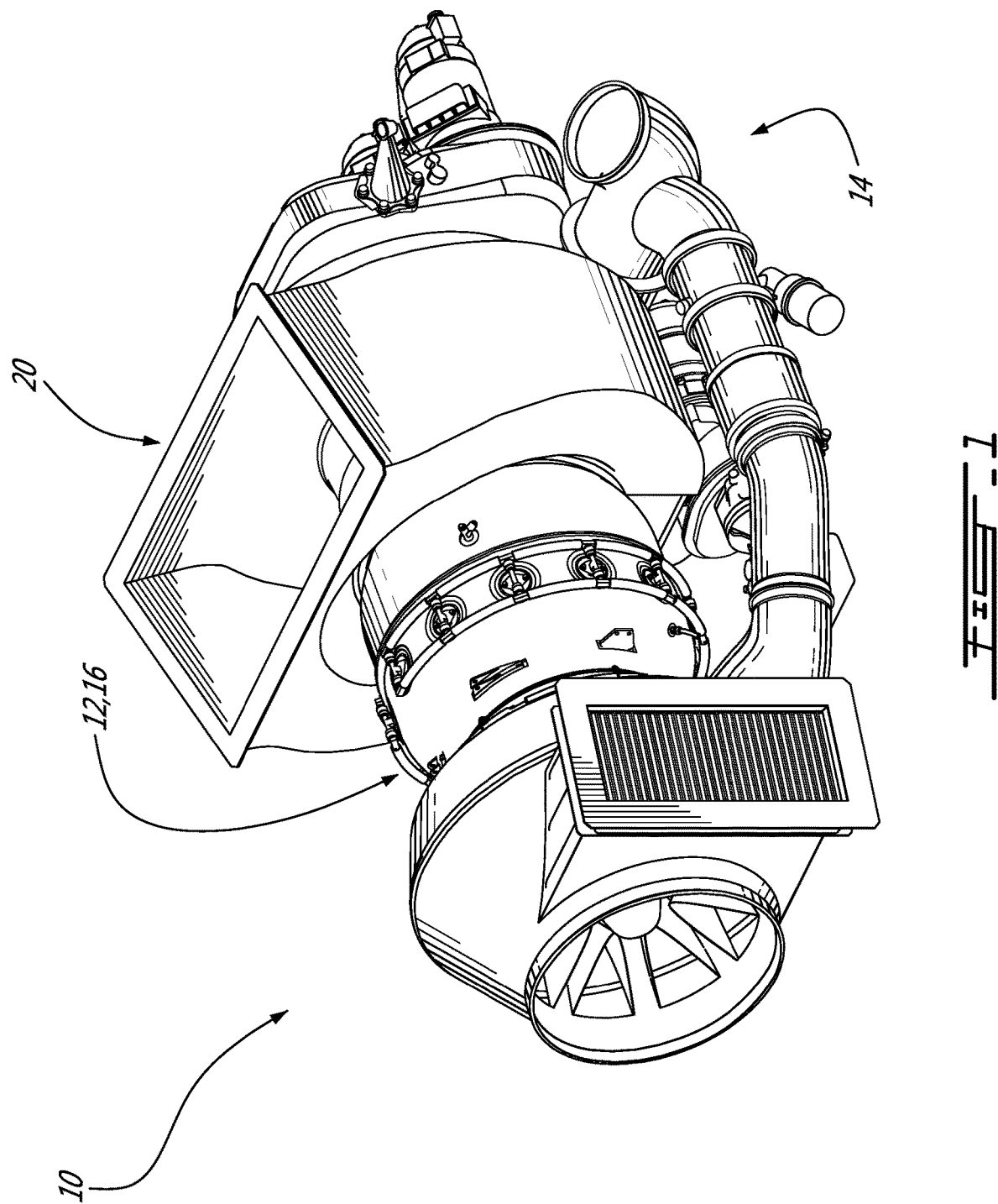

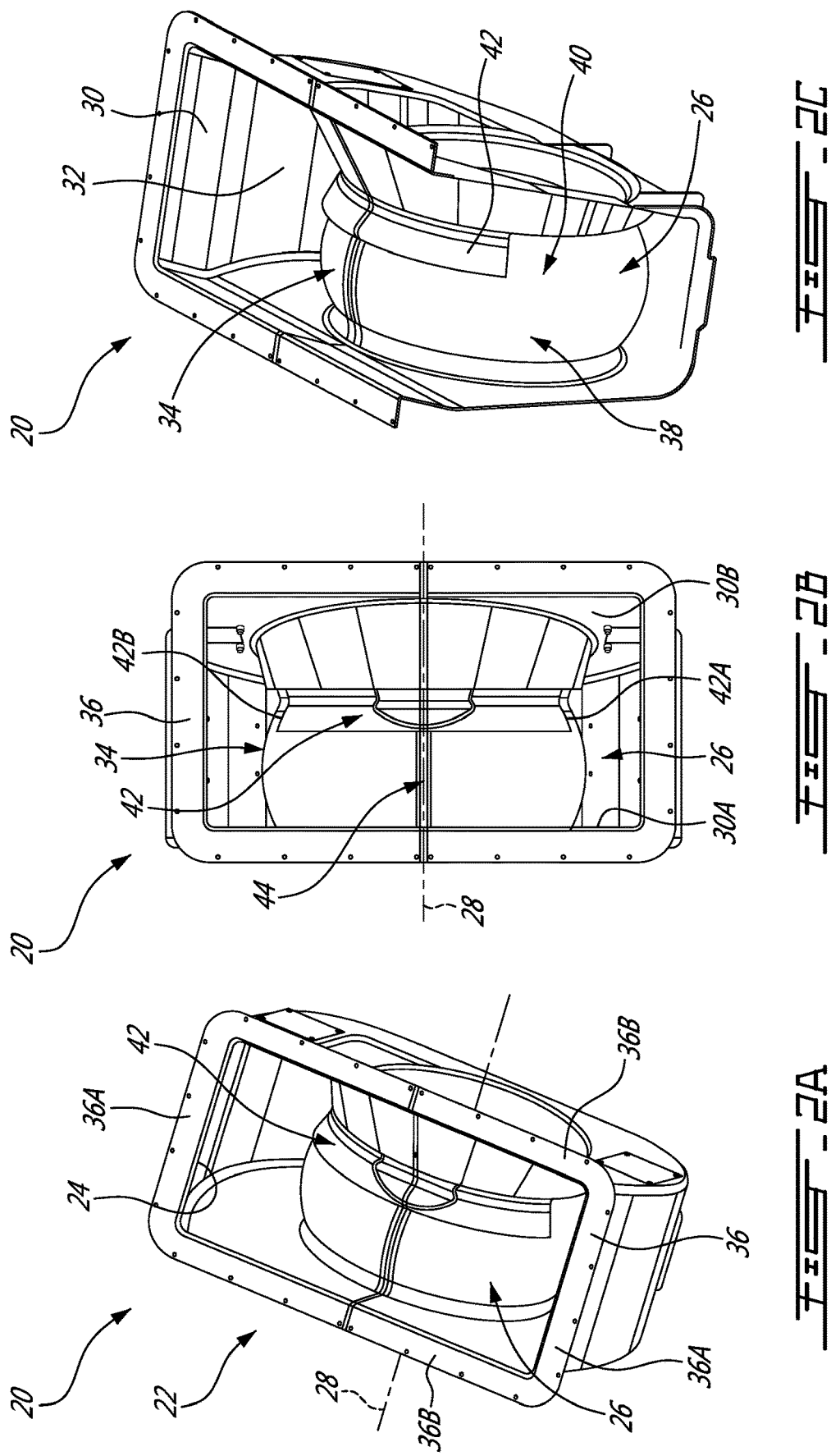

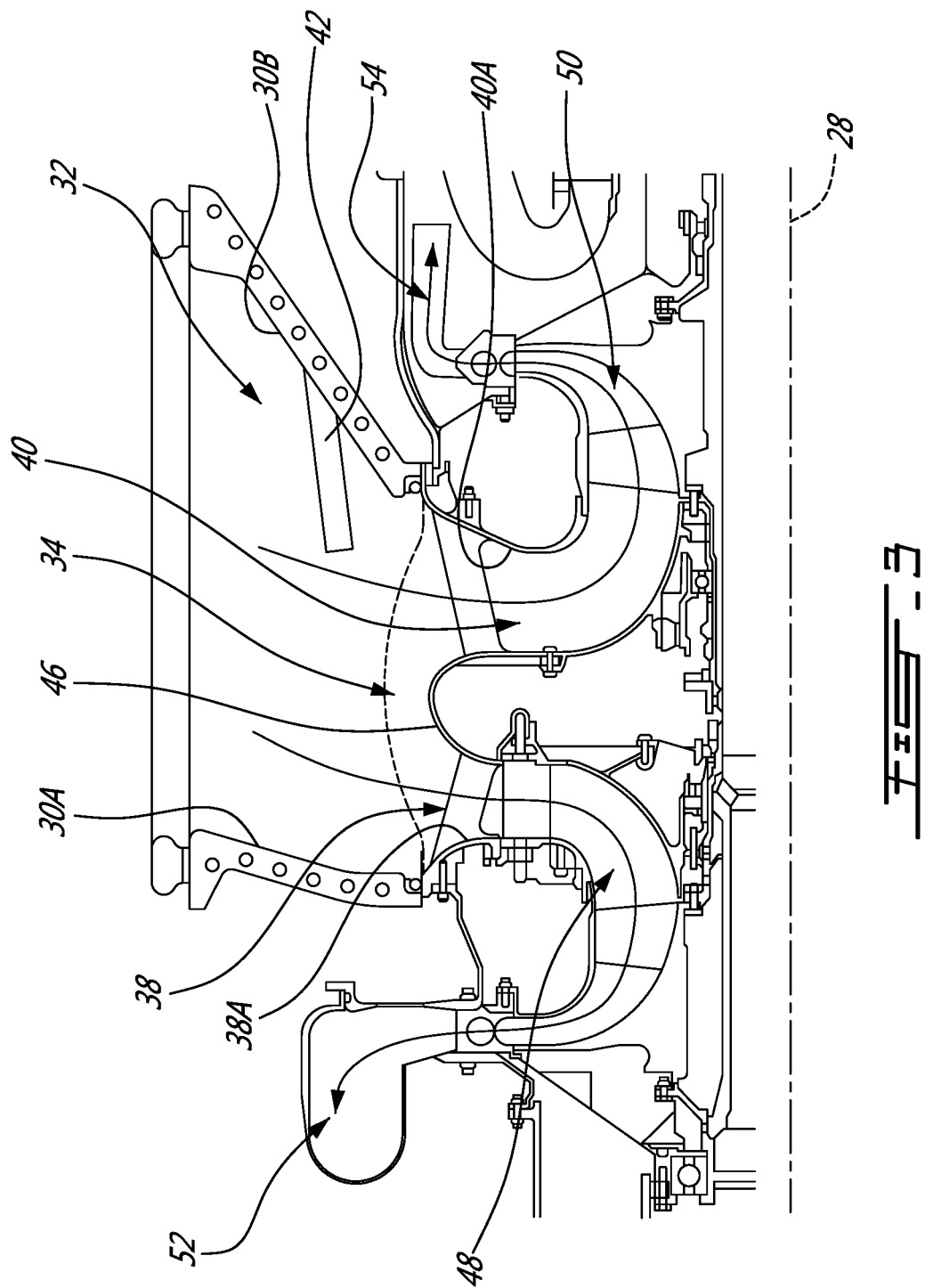

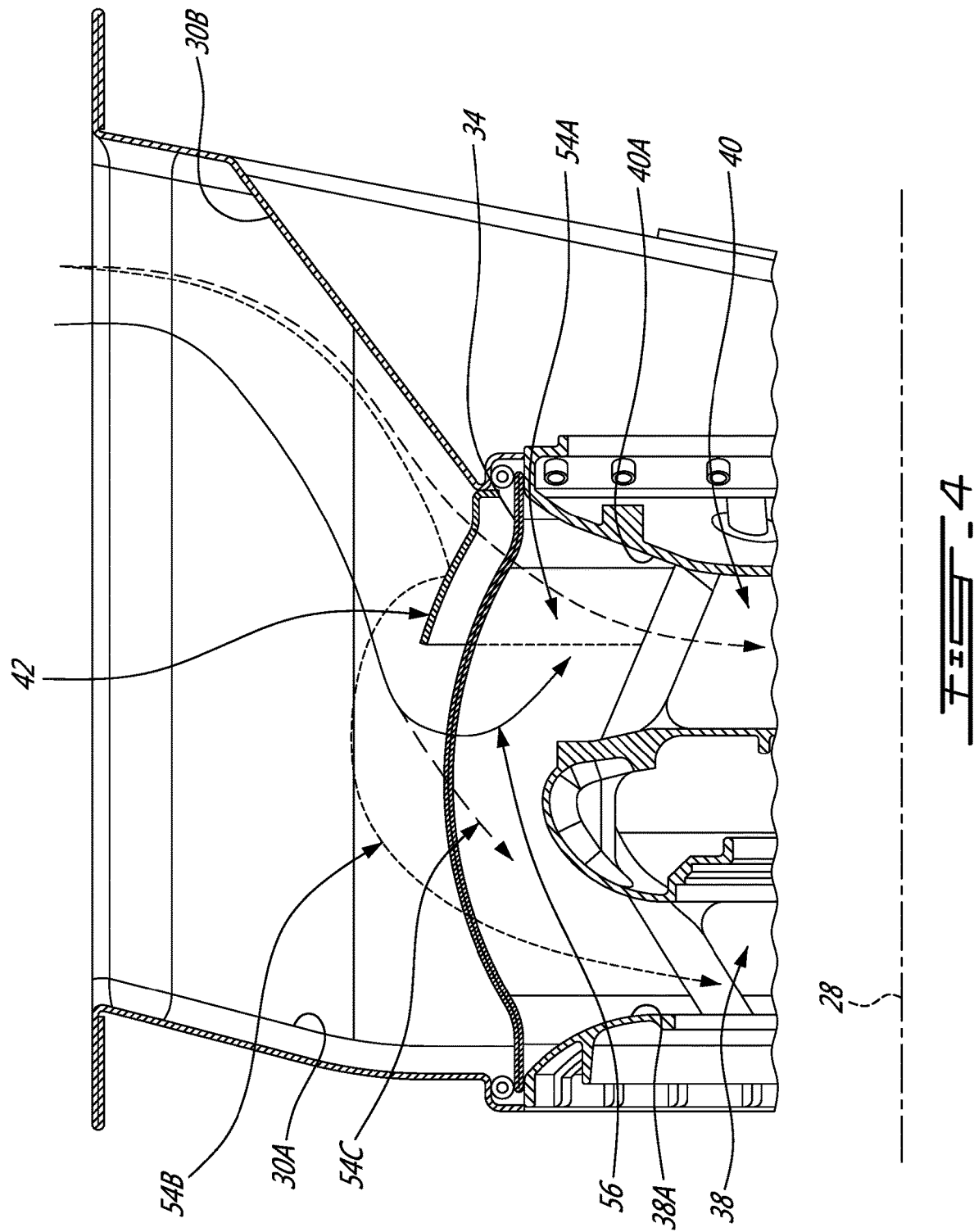

AIR INLET SYSTEM FOR AUXILIARY POWER UNITS

TECHNICAL FIELD

The application relates generally to auxiliary power units for aircraft use and, more particularly, to an air inlet system for the auxiliary power units.

BACKGROUND OF THE ART

Large aircraft often use an on-board auxiliary power unit (APU) to provide electrical power and compressed air for systems throughout the airplane. The APUs are generally gas turbine engines, often mounted in the aft tail section of the aircraft. The APU may have a load compressor for driving various accessories and a power compressor for providing compressed air to a combustor and subsequently driving the load compressor and the power compressor. The APU may draw air through a common air inlet for providing the air to the load and power compressors. However, when operating the APU in environments with high concentration of particulate matter, such as sand and dust, hot section components of the APU may become more susceptible to erosion and blockage. In such circumstances, maintenance frequency of the hot section components may thus increase.

SUMMARY

In one aspect, there is provided an air inlet system for an auxiliary power unit (APU), the air inlet system comprising: an intake duct having a wall defining an inlet plenum and forming an inlet opening configured to direct air into the inlet plenum; a load compressor passage having a load compressor inlet in fluid communication with the inlet plenum and leading to a load compressor of the APU; a core compressor passage having a core compressor inlet in fluid communication with the inlet plenum and leading to a core compressor of the APU; a deflector extending in the inlet plenum between the inlet opening and the core compressor inlet, the deflector configured to deflect at least part of particles carried by an incoming airflow away from the core compressor inlet toward the load compressor inlet.

In another aspect, there is provided an auxiliary power unit (APU) comprising: a load compressor providing compressed air to an aircraft; a core compressor in fluid flow communication with a combustor; an intake duct having a wall defining an inlet plenum providing a common air inlet for the load compressor and the core compressor; a splitter mounted in the intake duct, the splitter bifurcating the common air inlet between a load compressor inlet communicating with the load compressor and a core compressor inlet communicating with the core compressor; and a deflector mounted in the intake duct and extending in the inlet plenum, the deflector configured to deflect at least a first airflow stream away from the core compressor inlet toward the load compressor inlet, the deflector extending at most to the splitter without extending in the inlet plenum between the inlet opening and the load compressor inlet when viewed along a direction of a second airflow stream flowing through the intake duct from the inlet opening to the load compressor inlet.

In a further aspect, there is provided a method for supplying air to an auxiliary power unit (APU), the method comprising ingesting air through an air inlet; directing a first airflow of the air toward a load compressor inlet; directing a second airflow of the air toward a core compressor inlet; and deflecting a portion of the second airflow away from the core compressor inlet toward the load compressor inlet.

DESCRIPTION OF THE DRAWINGS

Reference is now made to the accompanying figures in which:

FIG. 1 is a perspective view of an auxiliary power unit (APU);

FIG. 2A is a perspective view of an air inlet of the APU of FIG. 1;

FIG. 2B is a top view of the air inlet of FIG. 2A;

FIG. 2C is perspective view, partially sectioned, of the air inlet;

FIG. 3 is a cross-sectional view of a top portion of the air inlet;

FIG. 4 is a cross-sectional view illustrating airflows in the air inlet; and

DETAILED DESCRIPTION

Figure 5A:
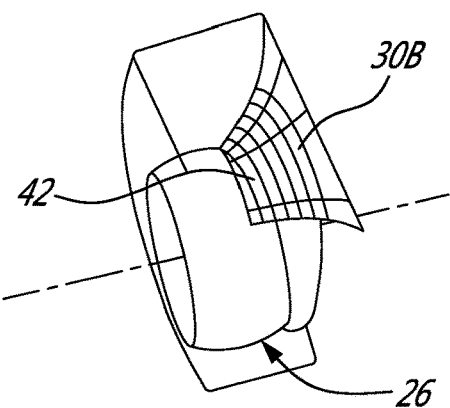
FIGS. 5A-5F are schematic perspective views of the air inlet in accordance with different examples of the present disclosure.

FIG. 1 illustrates an auxiliary power unit 10 commonly referred to by the acronym "APU". The APU 10 is generally positioned in a compartment, which may be located in an aft fuselage of an aircraft. The APU 10 generally comprises a power section 12 for providing energy to run the APU 10 and a load section 14 driven by the power section 12 for providing compressed air, driving components of the aircraft, and the like. The power section 12 may include a gas turbine power plant 16 and the load section 14 may include a load gearbox. The gas turbine power plant 16 generally comprises in serial flow communication a compressor section for pressurizing air, a combustor in which the compressed air is mixed with fuel and ignited for generating an annular stream of hot combustion gases, and a turbine section for extracting energy from the combustion gases. The power section 12 includes a core compressor of the compressor section and the load section may include a load compressor. The compressors provide compressed air respectively to the power and load sections 12, 14 of the APU 10.

The APU 10 includes an air inlet system 20 for ingesting the air therein. The air inlet system 20 provides a common air inlet for the power section 12 and the load section 14. In use, the air enters the APU 10 through the common air inlet. A first portion of the air is directed to the core compressor and a second stream/portion of the air is directed to the load compressor. In certain embodiments, all the ingested air is either directed to the core compressor or directed to the load compressor.

In certain operating conditions, the ingested air may contain particles such as sand, dust, and/or any other impurities that may affect the operation of the power section 12. The gas turbine power plant 16 may thus be susceptible to erosion due to the particles contained in the ingested air. In some cases, the particles may block effusion holes defined in a liner of the combustor of the gas turbine power plant 16.

In some embodiments, the air inlet system 20 may include a deflector mechanism to direct air, particles, or both, away from the power section 12 toward the load section 14. As such, a certain portion of the particles may be deflected away from the power section 12 toward the load section 14. The deflector mechanism may reduce the concentration of particles entering the power section 12. The defector mechanism may decrease a maintenance frequency of the APU 10 by reducing the concentration of the particles ingested into the power section 12 relative to the APU 10 without the deflector mechanism.

Referring to FIGS. 2A-2C, the air inlet system 20 may include an intake duct 22 that extend between an inlet opening 24 and an outlet portion 26. In some embodiments, during operation of the APU 10, the air is drawn into the air inlet system 20 through a single inlet opening 24. The inlet opening 24 may be defined in an exterior surface of the aircraft. The outlet portion 26 may form a circumferential opening or openings about a center axis 28.

The intake duct 22 has a wall 30 that defines an inlet plenum 32 surrounding the outlet portion 26. In use, the air may enter the inlet plenum 32 through the inlet opening 24. The inlet plenum 32 may extend between the inlet opening 24 and the outlet portion 26. The wall 30 may have two opposed wall surfaces 30A, 30B spaced-apart along the center axis 28. The two wall surfaces 30A, 30B are shown in FIG. 2B as a first wall surface 30A and a second wall surface 30B. The wall surfaces 30A, 30B may extend substantially radially relative to the center axis 28. The term "substantially" is intended to include a vertical, or approximately vertical (see the first wall surface 30A in FIG. 3). The wall surfaces 30A, 30B may extend at an angle relative to the center axis 28. For example, as illustrated in FIG. 3, the second wall surface 30B is disposed at an angle relative to the center axis 28 and the first wall surface 30A is disposed substantially radially relative to the center axis 28.

The air inlet system 20 may include an inlet screen 34 mounted in the inlet plenum 32 about the outlet portion 26. For example, the inlet screen 34 may extend circumferentially about the center axis 28. The inlet screen 34 is intended to refer to any suitable protective covering that may screen out particulates of a certain size, such as rocks, ice, and the like. The inlet screen 34 may include apertures sized to block the particulates and yet allow a sufficient airflow therethrough. In some embodiments, smaller particles such as sand and dust may still pass through the apertures.

The intake duct 22 may have an edge 36 of a rectangular shape that defines a periphery of the inlet opening 24. The edge 36 has two opposed longitudinal segments 36A and two opposed lateral segments 36B. The lateral segments 36B may be disposed transversally relative to a reference plane that includes the center axis 28. In other words, the center axis 28 lies in the reference plane. The edge 36 may have other suitable shapes. The first and second wall surfaces 30A, 30B may terminate with the lateral segments 36B of the edge 36.

The outlet portion 26 may extend longitudinally along the center axis 28 between the first wall surface 30A and the second wall surface 30B. The outlet portion 26 may split an outlet of the intake duct 22 in two subdivisions to direct a first airflow of the ingested air to the load compressor and to direct a second airflow of the ingested air to the core compressor.

The air inlet system 20 may include a load compressor passage and a core compressor passage. The load compressor passage may have a load compressor inlet 38 in fluid communication with the inlet plenum 32 to fluidly communicates a portion of the ingested air from the inlet plenum 32 to the load compressor. In other words, the load compressor passage provides the fluid communications and directs air to the load compressor. The core compressor passage may have a core compressor inlet 40 in fluid communication with the inlet plenum 32 to fluidly communicates a portion of the ingested air from the inlet plenum 32 to the core compressor. In other words, the core compressor passage provides the fluid communications and directs air to the core compressor.

The outlet portion 26 may terminate in the load compressor inlet 38 and the core compressor inlet 40 (FIG. 2C). The load compressor inlet 38 fluidly communicates the first airflow to the load compressor and the core compressor inlet 40 fluidly communicates the second airflow to the core compressor. The inlets 38, 40 may be formed separately such that they do not communicate therebetween. That is, in some embodiments, the first airflow flowing through the load compressor inlet 38 downstream of the outlet portion 26 relative an airflow through the air inlet system 20 is unable to pass or flow to the core compressor inlet 40. Similarly, the second airflow flowing through the core compressor inlet 40 downstream of the outlet portion 26 relative the airflow through the air inlet system 20 may be unable to pass or flow to the load compressor inlet 38.

The deflector mechanism may include a deflector 42 mounted in the intake duct 22. In some examples, the deflector 42 is a plate, which can be provided in the form of an arc segment that is suitable to deflect a stream of the air. The deflector 42 may be positioned and sized to deflect and direct a portion of the second airflow away from the core compressor inlet 40 toward the load compressor inlet 38. For example, the deflector 42 may cover at least partially the core compressor inlet 40 to deflect a portion of the second airflow away from the core compressor inlet 40 toward the load compressor inlet 38. The deflector 42 may extend from the second wall surface 30B into the inlet plenum 32.

The deflector 42 may have any suitable shape and size to deflect a portion of the particles within the second airflow away from the core compressor inlet 40 toward the load compressor inlet 38 while simultaneously allowing sufficient air to enter the core compressor inlet 40 to feed the core compressor. For example, computational fluid dynamics (CFD) analysis may be used or carried out to design the configuration of the deflector 42 to maintain the sufficient airflow into the core compressor with minimal pressure drop and flow distortion relative to an air inlet system without the deflector 42. In some embodiments, the deflector mechanism may include any suitable deflector to direct the particles away from the core compressor inlet 40 toward the load compressor inlet 38, thereby reducing the proportion of the particles that may enter the core compressor inlet 40.

The deflector 42 may extend circumferentially between a first end 42A and an opposed second end 42B. The deflector 42 may define an arc of at least 90 degrees between the ends 42A, 42B around the center axis 28. In other words, the angle between radial projections from the ends 42A, 42B to the center axis 28 correspond to 90 degrees. The arc may extend at least 120 degrees between the ends 42A, 42B. The arc may also extend at least 180 degrees between the ends 42A, 42B. The deflector 42 may extend circumferentially about the center axis 28 forming an annular segment around the center axis 28.

The deflector 42 may be disposed in the inlet plenum 32 such that a midplane 44 of the deflector 42 that extends along the center axis 28 is coplanar with a midplane of the edge 36 or coplanar with the reference plane. In other words, the defector 42 extend circumferentially equally from each side of the reference plane.

Referring to FIG. 3, a splitter 46 is disposed between the first wall surface 30A and the second wall surface 30B to divide the outlet portion 26 into the load compressor inlet 38 and the core compressor inlet 40. In other words, the splitter 46 bifurcates the outlet portion 26 between the load compressor inlet 38 and the core compressor inlet 40. In other words, the splitter 46 may divide the common air inlet between the load compressor inlet 38 and the core compressor inlet 40.

The load compressor inlet 38 may have a circumferential opening 38A defined about the center axis 28 between the first wall 30A surface and the splitter 46. The core compressor inlet 40 may have a circumferential opening 40A defined about the center axis 28 between the second wall surface 30B and the splitter 46. The circumferential openings 38A, 40A at least partially direct the airflows radially toward the center axis 28. The load compressor inlet 38 may direct the first airflow 52 to the load compressor 48 and the core compressor inlet 40 may direct the second airflow 54 to the core compressor 50. The load compressor inlet 38 and the core compressor inlet 40 may have other suitable configurations to direct the airflows toward the load compressor 48 and the core compressor 50.

The deflector 42 may extend from the second wall surface 30B in the inlet plenum 32 radially over the core compressor inlet 40. In other words, as shown in the cross-sectional view of FIG. 3, the deflector 42 does not extend vertically over the load compressor inlet 38. That is, the deflector 42 is not intended to deflect the first airflow 52 away from the load compressor inlet 38 toward the core compressor inlet 40. As such, in some embodiments, the deflector 42 extends longitudinally at most to the splitter 46 without extending radially over the load compressor inlet 38 relative to the center axis 28. The inlet plenum 32 may remain free of the deflector 42 radially about the center axis 28 between the first wall surface 30A and the splitter 46. In other words, an airflow passage defined between the inlet opening 24 and the load compressor inlet 38 may remain free from the deflector when viewed along a direction of an airflow flowing through the airflow passage from the inlet opening 24 to the load compressor inlet 38. The airflow passage may be determined by CFD analysis. The deflector 42 may be mounted radially outward of the inlet screen 34 relative to the center axis 28. Alternately, the deflector 42 may be mounted radially inward of the inlet screen 34. In one example, the inlet plenum 32 is free of the deflector 42 between the inlet opening 24 and the load compressor inlet 38.

A longitudinal cross-section of the deflector 42 may be disposed at an angle relative to the center axis 28. For example, the deflector 42 shown in FIG. 3 converges toward the center axis 28 while extending in the inlet plenum 32. The deflector 42 may continuously converge without diverging relative to the center axis 28.

Referring to FIG. 4, an example of airflows and particles trajectory during an operation of the APU 10 is shown. The first airflow 52 is directed radially toward the load compressor inlet 38 relative to the center axis 28. The second airflow 54 is directed radially toward the core compressor inlet 40 relative to the center axis 28. The potential trajectory of the particles without the deflector 42 installed is shown in a dotted lines as 54A. The trajectory of the particles with the deflector installed is shown as 54B.

As mentioned above, the particles may be diverted from the core compressor inlet 40 by a physical barrier of the deflector 42 directing the particles toward the load compressor inlet 38. In the example shown in FIG. 4, the deflector 42 diverges away from the center axis 28 while extending in the inlet plenum 32. The deflector 42 may continuously diverge without converging.

The particles may be diverted from the core compressor inlet 40 by inertial separation. For example, by forming a flow path 56 from the inlet opening 24 to the core compressor inlet 40 that contains a tight bend such that higher inertial particles may not follow the flow path 56, through the tight bend, to the core compressor inlet 40 and are instead directed to the load compressor inlet 38. The tight bend may depend on the APU 10 configuration. The CFD analysis may be used to define a suitable size and shape of the deflector 42 to provide the tight bend for directing at least a portion of the particles in the second airflow 54 toward the load compressor inlet 38. The trajectory of the particles separated by the inertial separation is shown as 54C.

Figure 5B:
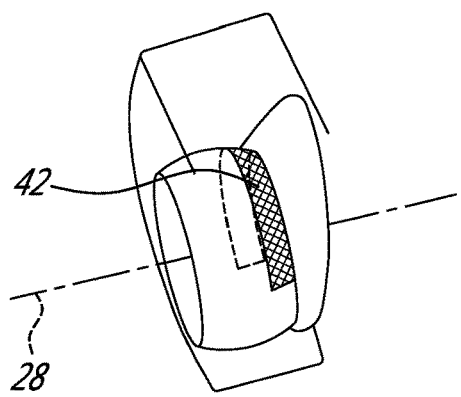
Figure 5C:
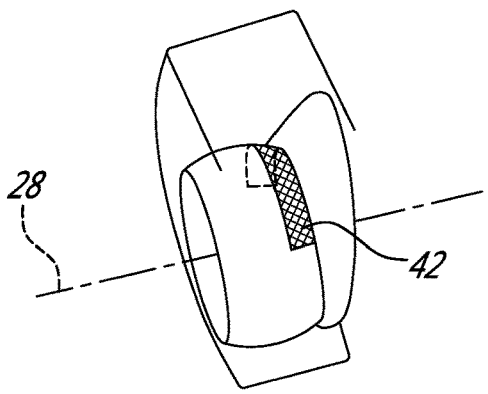
Figure 5D:
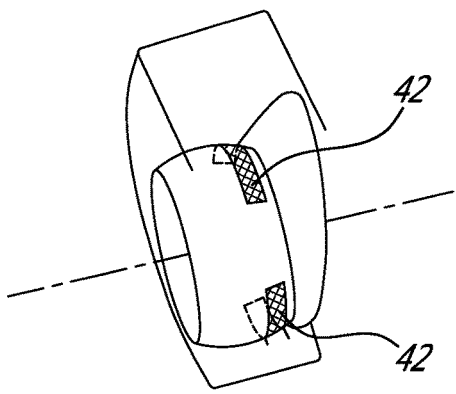
Figure 5E:
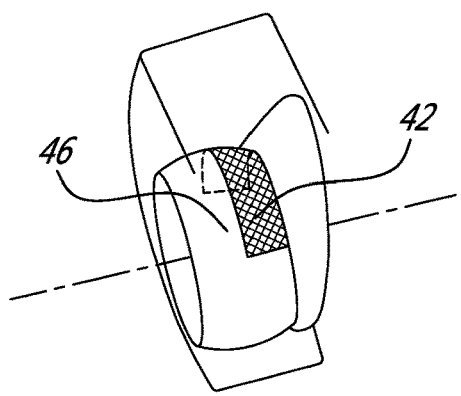
Figure 5F:
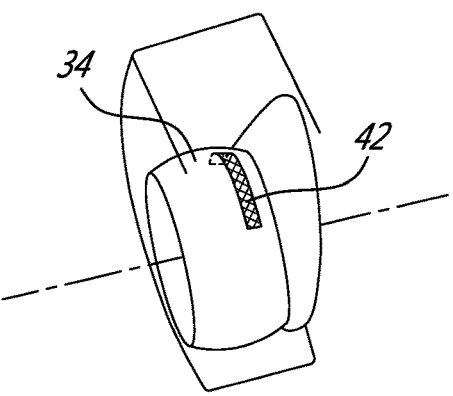

Referring to FIGS. 5A-5F, different examples of the deflector 42 are shown. FIG. 5A illustrates the deflector 42 with an aerodynamic shape blended with a shape of the second wall surface 30B. FIG. 5B illustrates the deflector 42 extending circumferentially about the center axis 28. FIG. 5C illustrates a perforated deflector 42. FIG. 5D illustrates the deflector 42 having multiple segments 42 separately mounted around the center axis 28. The multiple segments may be uniformly disposed about the center axis 28. FIG. 5E illustrates that the deflector 42 may have different longitudinal lengths. The deflector 42 shown in FIG. 5E extends lengthwise along the center axis 28 close to the splitter 46. FIG. 5F illustrates the deflector 42 mounted radially inward of the inlet screen 34 relative to the center axis 28. As mentioned above, the deflector 42 may have different sizes and shapes depending on the configuration of the APU 10.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An air inlet system for an auxiliary power unit (APU), the air inlet system comprising:
    an intake duct having a wall defining an inlet plenum and forming an inlet opening configured to direct air into the inlet plenum;
    a load compressor passage having a load compressor inlet in fluid communication with the inlet plenum and leading to a load compressor of the APU;
    a core compressor passage having a core compressor inlet in fluid communication with the inlet plenum and leading to a core compressor of the APU;
    a deflector extending in the inlet plenum between the inlet opening and the core compressor inlet, the deflector configured to deflect at least part of particles carried by an incoming airflow away from the core compressor inlet toward the load compressor inlet, wherein the deflector extends circumferentially between a first end and an opposed second end along an arc around a center axis of the APU.

2. The air inlet system as defined in claim 1, wherein the intake duct has an edge of a rectangular shape defining a periphery of the inlet opening, the edge extending laterally relative to the center axis of the APU between two opposed longitudinal segments of the edge, a midplane of the deflector extending longitudinally along the center axis of the APU being coplanar with a midplane of the edge.

3. The air inlet system as defined in claim 1, wherein the load compressor inlet has a first circumferential opening defined about the center axis of the APU within the inlet plenum, and the core compressor inlet has a second circumferential opening defined about the center axis of the APU within the inlet plenum.

4. The air inlet system as defined in claim 1, wherein the arc of the deflector defines an angle of at least 90 degrees around the center axis of the APU.

5. The air inlet system as defined in claim 4, wherein the deflector extends circumferentially about the center axis of the APU.

6. The air inlet system as defined in claim 1, wherein the deflector diverges away from the center axis of the APU while extending in the inlet plenum relative to a direction from the wall to a splitter between the load compressor passage and the core compressor passage, the core compressor inlet at least partially surrounding the center axis of the APU.

7. The air inlet system as defined in claim 1, wherein the deflector is perforated.

8. The air inlet system as defined in claim 1, wherein the deflector includes at least two arcuate segments separately mounted around the center axis of the APU.

9. The air inlet system as defined in claim 1, comprising an inlet screen mounted in the inlet plenum about the center axis of the APU, and wherein the deflector is mounted radially outward of the inlet screen relative to the center axis of the APU.

10. The air inlet system as defined in claim 1, comprising an inlet screen mounted in the inlet plenum about the center axis of the APU, and wherein the deflector is mounted radially inward of the inlet screen relative to the center axis of the APU.

11. The air inlet system as defined in claim 1, wherein the inlet plenum is free of the deflector at a location of the load compressor inlet along the center axis of the APU.

12. An auxiliary power unit (APU) comprising:
a load compressor providing compressed air to an aircraft;
a core compressor in fluid flow communication with a combustor;
an intake duct having a wall defining an inlet plenum providing a common air inlet for the load compressor and the core compressor;
a splitter mounted in the intake duct, the splitter bifurcating the common air inlet between a load compressor inlet communicating with the load compressor and a core compressor inlet communicating with the core compressor;
a deflector mounted in the intake duct and extending in the inlet plenum, the deflector configured to deflect at least a first airflow stream away from the core compressor inlet toward the load compressor inlet, the deflector extending at most to the splitter without extending in the load compressor inlet when viewed along a direction of a second airflow stream flowing through the intake duct from the common air inlet to the load compressor inlet; and
an inlet screen mounted in the inlet plenum about a center axis of the APU, the deflector mounted radially outward of the inlet screen relative to the center axis of the APU.

13. The APU as defined in claim 12, wherein the load compressor inlet has a first circumferential opening defined about the center axis of the APU between the wall and the splitter, and the core compressor inlet has a second circumferential opening defined about the center axis of the APU between the wall and the splitter.

14. The APU as defined in claim 12, wherein the deflector extends circumferentially between a first end and an opposed second end along an arc defined by an angle of at least 90 degrees around the center axis of the APU.

15. The APU as defined in claim 12, wherein the deflector extends circumferentially about the center axis of the APU.

16. The APU as defined in claim 12, wherein the deflector diverges away from the center axis of the APU while extending in the inlet plenum relative to a direction from the wall to the splitter, the core compressor inlet at least partially surrounding the center axis of the APU.

17. The APU as defined in claim 12, wherein the deflector is perforated.

18. The APU as defined in claim 12, wherein the deflector includes at least two segments separately mounted around the center axis of the APU.

19. A method for supplying air to an auxiliary power unit (APU), the comprising an air inlet system having:
an intake duct having a wall defining an inlet plenum and forming an inlet opening configured to direct air into the inlet plenum;
a load compressor passage having a load compressor inlet in fluid communication with the inlet plenum and leading to a load compressor of the APU;
a core compressor passage having a core compressor inlet in fluid communication with the inlet plenum and leading to a core compressor of the APU;
a deflector extending in the inlet plenum between the inlet opening and the core compressor inlet, wherein the deflector extends circumferentially between a first end and an opposed second end along an arc around a center axis of the APU, the method comprising: ingesting air through the inlet opening; directing a first airflow of the air toward the load compressor inlet; directing a second airflow of the air toward the core compressor inlet; and deflecting a portion of the second airflow away from the core compressor inlet toward the load compressor inlet.

20. The method as defined in claim 19, comprising directing particles contained in the second airflow toward the load compressor inlet by inertial separation.

* * * * *